US009499647B2

(12) United States Patent
Matsushita et al.

(10) Patent No.: US 9,499,647 B2
(45) Date of Patent: *Nov. 22, 2016

(54) POLYMER, RUBBER COMPOSITION CONTAINING POLYMER, CROSSLINKED RUBBER COMPOSITION OBTAINED BY CROSSLINKING RUBBER COMPOSITION, AND TIRE HAVING CROSSLINKED RUBBER COMPOSITION

(71) Applicant: BRIDGESTONE CORPORATION, Chuo-ku, Tokyo (JP)

(72) Inventors: Junko Matsushita, Tachikawa (JP); Shojiro Kaita, Oizumi-machi (JP); Satoru Tamaki, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/380,250

(22) PCT Filed: Mar. 6, 2013

(86) PCT No.: PCT/JP2013/001400
§ 371 (c)(1),
(2) Date: Aug. 21, 2014

(87) PCT Pub. No.: WO2013/132846
PCT Pub. Date: Sep. 12, 2013

(65) Prior Publication Data
US 2015/0025173 A1 Jan. 22, 2015

(30) Foreign Application Priority Data
Mar. 7, 2012 (JP) ................................. 2012-050994

(51) Int. Cl.
| C08F 36/08 | (2006.01) |
| C08F 136/08 | (2006.01) |
| B60C 1/00 | (2006.01) |
| C08C 2/04 | (2006.01) |
| C08L 7/00 | (2006.01) |
| C08L 47/00 | (2006.01) |

(52) U.S. Cl.
CPC ............ *C08F 136/08* (2013.01); *B60C 1/0016* (2013.04); *C08C 2/04* (2013.01); *C08F 36/08* (2013.01); *C08L 7/00* (2013.01); *C08L 47/00* (2013.01)

(58) Field of Classification Search
CPC .... C08F 36/08; C08F 136/08; C08F 236/08; C08F 2500/01; C08L 9/00; C08L 15/00
See application file for complete search history.

(56) References Cited

U.S. PATENT DOCUMENTS

| 3,058,971 | A | * | 10/1962 | Miller ...................... C08C 2/06 528/495 |
| 5,082,906 | A | | 1/1992 | Hsu et al. |
| 5,104,941 | A | * | 4/1992 | Wolpers ................ B60C 1/0016 152/905 |
| 2003/0141268 | A1 | | 7/2003 | Kerns et al. |
| 2005/0233894 | A1 | | 10/2005 | Kaita et al. |
| 2008/0190532 | A1 | * | 8/2008 | Suzuki ...................... B60C 1/00 152/209.1 |
| 2009/0264604 | A1 | | 10/2009 | Kaita et al. |
| 2013/0211010 | A1 | * | 8/2013 | Horikawa ............. C08F 297/08 525/232 |

FOREIGN PATENT DOCUMENTS

| CN | 1134434 A | 10/1996 | |
| CN | 101357960 A | 2/2009 | |
| CN | 101475652 A | 7/2009 | |
| DE | 2 245 370 A1 * | 9/1972 | ............... C08D 7/00 |
| EP | 2267040 A1 | 12/2010 | |
| JP | 2004-027179 A | 1/2004 | |
| JP | 2004-238637 A | 8/2004 | |
| JP | 2010-202769 A | 9/2010 | |
| JP | 2012-31314 A | 2/2012 | |
| JP | 2012-031314 A | 2/2012 | |
| WO | 2004/063230 A1 | 7/2004 | |
| WO | 2006/078021 A1 | 7/2006 | |
| WO | 2007/129670 A1 | 11/2007 | |
| WO | 2012/014456 A1 | 2/2012 | |
| WO | WO 2012/014456 A1 * | 2/2012 | ............ C08F 236/04 |
| WO | WO 2012/014457 A1 * | 2/2012 | ............ C08F 297/08 |

OTHER PUBLICATIONS

DE 2 245 370 (Corradini et al.) Mar. 29, 1973; machine translation.*
International Search Report of PCT/JP2013/001400 dated May 14, 2013 [PCT/ISA/210].
Office Action issued Jun. 11, 2015 in corresponding Russian Patent Application No. 2014140297 with translation.
Communication dated Sep. 2, 2015, issued by the State Intellectual Property Office of the P.R.C. in corresponding Chinese Application No. 201380012579.7.
Communication dated Oct. 5, 2015 from the European Patent Office issued in counterpart European application No. 13758113.8.
Shojiro Kaita, et al., "An Efficient Gadolinium Metallocene-Based Catalyst for the Synthesis of Isoprene Rubber with Perfect 1,4 Cis Microstructure and Marked Reactivity Difference between Lanthanide Metallocenes toward Dienes as Probed by Butadiene-Isoprene Copolymerization Catalysis", XP-002744305, Macromolecules, vol. 37, No. 16, 2004, pp. 5860-5862.
Database WPI Week 197902, Thomson Scientific., London, GB; AN 1979-03688B, XP002744580.

* cited by examiner

*Primary Examiner* — Rip A Lee
(74) *Attorney, Agent, or Firm* — Sughrue Mion, PLLC

(57) ABSTRACT

Provided are: a polymer capable of providing a crosslinked rubber composition with improved durability (i.e., breaking resistance, abrasion resistance, and crack growth resistance) and a method for producing the same, a rubber composition containing the polymer, a crosslinked rubber composition obtained by crosslinking the rubber composition, and a tire having the crosslinked rubber composition. The polymer is either a synthesized polyisoprene or an isoprene copolymer, and contains a residual catalyst in an amount of 300 ppm or less.

8 Claims, No Drawings

POLYMER, RUBBER COMPOSITION CONTAINING POLYMER, CROSSLINKED RUBBER COMPOSITION OBTAINED BY CROSSLINKING RUBBER COMPOSITION, AND TIRE HAVING CROSSLINKED RUBBER COMPOSITION

CROSS REFERENCE TO RELATED APPLICATIONS

This is a National Stage of International Application No. PCT/JP2013/001400 filed Mar. 6, 2013, claiming priority based on Japanese Patent Application No. 2012-050994 filed Mar. 7, 2012, the contents of all of which are incorporated herein by reference in their entirety.

TECHNICAL FIELD

The present invention relates to a polymer, a rubber composition containing the polymer, a crosslinked rubber composition obtained by crosslinking the rubber composition, and a tire having the crosslinked rubber composition; and in particular, to a polymer capable of providing a crosslinked rubber composition with improved durability (i.e., breaking resistance, abrasion resistance, and crack growth resistance), a rubber composition containing such a polymer, a crosslinked rubber composition obtained by crosslinking the rubber composition, and a tire having the crosslinked rubber composition.

BACKGROUND ART

In light of the recent social demand for saving energy and resources, rubber materials with high breaking resistance, high abrasion resistance, and high crack growth resistance are now desired commonly to respond to the demand for tires with improved durability. Further, a surge in natural rubber prices has created a need for developing synthetic rubber that exhibits durability equal to that of natural rubber.

To enhance durability of the synthetic rubber, the cis content of synthetic polyisoprene is conventionally increased to improve strain-induced crystallinity. Refer, for example, to JP 2004-27179 A (PTL 1) and WO 2006/078021 (PTL 2). However, the synthetic rubber improved in this manner is still less durable than natural rubber when subjected to higher severity conditions.

Furthermore, a polymer having an isoprene skeleton is likely to show main-chain breaks compared to a polymer composed of other monomers. This main-chain break is considered causing the less durability of the polymer under high severity conditions. Additionally, in synthesizing a polymer to impart high-molecular weight, the chain ends of the polymer may be denatured with tin tetrachloride or titanium tetrachloride. This denaturation involves gelation commonly, thereby significantly reducing the durability of the polymer.

CITATION LIST

Patent Literature

PTL 1: JP 2004-27179 A
PTL 2: WO 2006/078021

SUMMARY OF INVENTION

Technical Problem

In light of the above, an object of the present invention is to provide a polymer capable of providing a crosslinked rubber composition with improved durability (i.e., breaking resistance, abrasion resistance, and crack growth resistance), a rubber composition containing such a polymer, a crosslinked rubber composition obtained by crosslinking the rubber composition, and a tire having the crosslinked rubber composition.

Solution to Problem

The inventors of the present invention have found that a residual catalyst remaining in a polymer (at least one of a synthesized polyisoprene and an isoprene copolymer) by a certain reduced amount is less likely to inhibit crosslinking reaction of the polymer during vulcanization and that such a polymer with less amount of residual catalyst can provide a crosslinked rubber composition with durability (i.e., breaking resistance, abrasion resistance, and crack growth resistance) higher than that of conventional synthetic rubber, and have made the present invention.

The polymer of the present invention, being a synthesized polyisoprene or a isoprene copolymer, thus has a residual catalyst in an amount of 300 ppm or less. The polymer having 300 ppm or less residual catalyst can further reliably form a network structure when the rubber composition containing the polymer is in vulcanization.

A "synthesized polyisoprene" as used herein means an isoprene homopolymer obtained by polymerizing (or synthesizing) isoprene monomers. An "isoprene copolymer" as used herein means a copolymer composed of isoprene and a compound other than isoprene. The isoprene copolymer is obtained by polymerizing (or synthesizing) isoprene monomers and monomers of a compound other than isoprene. Both "synthesized polyisoprene" and "isoprene copolymer" encompass polymers having part of their polymer chains being denatured.

In producing the polymer of the present invention, it is particularly preferable to reduce the residual catalyst when the polymerization catalyst used is a catalyst derived from a Lewis acid. Examples of the catalyst derived from a Lewis acid include, as will be discussed in detail below, a boron-containing halogenated compound, such as $B(C_6F_5)_3$, and aluminum-containing halogenated compound, such as $Al(C_6F_5)_3$, which are frequently used as polymerization catalysts. The catalysts derived from a Lewis acid are known to inhibit a vulcanization acceleration effect caused by a vulcanization accelerator, and thus the residual amount thereof is particularly desired to be small.

In the polymer of the present invention, 3,4-vinyl bond content in an isoprene-derived unit in the synthesized polyisoprene or the isoprene copolymer is preferably 5% or less.

The synthesized polyisoprene or the isoprene copolymer having 3,4-vinyl bond content of 5% or less in its isoprene-derived unit can significantly improve its durability.

The term "3,4-vinyl bond content" as used herein refers to the ratio of the 3,4-vinyl structure to the whole isoprene unit in the synthesized polyisoprene or in the isoprene copolymer. The same definition applies to the terms "cis-1,4 bond content", "trans-1,4 bond content", and "1,2-vinyl bond content" as used herein.

A rubber composition of the present invention contains a rubber ingredient that at least contains the polymer of the present invention.

The rubber composition containing at least the polymer of the present invention significantly increases the strain-induced crystallinity, thereby providing a crosslinked rubber composition with improved durability (i.e., breaking resistance, abrasion resistance, and crack growth resistance).

The phrase "containing at least the polymer of the present invention" means that the rubber composition contains at least one of the synthesized polyisoprene and the isoprene copolymer.

The rubber composition of the present invention preferably has a total content of the polymer in the rubber ingredient in an amount of 15 to 100 mass %.

The rubber ingredient having the total polymer amount of 15 to 100 mass % allows the polymer to satisfactorily exhibit the effect of the improved strain-induced crystallinity.

The rubber composition of the present invention further contains a filler. The content of the filler is preferably 10 to 75 mass parts per 100 mass parts of the rubber ingredient.

The rubber composition containing the filler in an amount of 10 to 75 mass parts per 100 mass parts rubber ingredient can exhibit its effect and can be blended into the rubber ingredient satisfactorily.

The rubber composition having the filler content exceeding 75 mass parts per 100 mass parts of the rubber ingredient may impair the workability.

A crosslinked rubber composition of the present invention is obtained by crosslinking the rubber composition of the present invention.

The crosslinked rubber composition obtained by crosslinking the rubber composition improves the durability (i.e., breaking resistance, abrasion resistance, and crack growth resistance) of the crosslinked rubber composition.

The tire of the present invention contains the crosslinked rubber composition of the present invention.

The tire having the crosslinked rubber composition can improve the durability (i.e., breaking resistance, abrasion resistance, and crack growth resistance) of the tire.

The tire of the present invention includes a tread member having the crosslinked rubber composition of the present invention.

The tire including a tread member that has the crosslinked rubber composition can improve the durability (i.e., breaking resistance, abrasion resistance, and crack growth resistance) of the tread member.

Advantageous Effect of Invention

The present invention provides the polymer capable of providing the crosslinked rubber composition with improved durability (i.e., breaking resistance, abrasion resistance, and crack growth resistance), the rubber composition containing such a polymer, the crosslinked rubber composition obtained by crosslinking the rubber composition, and the tire having the crosslinked rubber composition.

DESCRIPTION OF EMBODIMENTS (Polymer)

The polymer of the present invention is a synthesized polyisoprene or an isoprene copolymer.

The catalyst contains a residual catalyst in an amount of 300 ppm (ratio by weight) or less. In particular, the amount of the residual catalyst is more preferably 200 ppm (ratio by weight) or less, and most preferably 100 ppm (ratio by weight) or less.

The residual catalyst remaining in the polymer in an amount of 300 ppm or less does not either inhibit the formation of a network structure when the rubber composition containing the polymer is vulcanized nor reduce the strain-induced crystallinity and durability.

The polymer having the residual catalyst in an amount of the above "more preferable" or "most preferable" range is advantageous in terms of forming the network structure.

The amount of the residual catalyst can be measured, for example, by performing element analysis on the residual metals (e.g., aluminium and gadolimium) in the polymer.

The catalyst will be discussed in detail below upon describing the method of producing the polymer.

The number average molecular weight (Mn) of the polymer is not particularly limited and may be selected as appropriate depending on the application thereof. Preferably, the number average molecular weight is 1.5 million or more, and more preferably 1.5 to 2.0 million. The polymer having the number average molecular weight (Mn) of 1.5 million or more can further improve the durability (i.e., breaking resistance, abrasion resistance, and crack growth resistance) of the crosslinked rubber composition, while the polymer having the number average molecular weight (Mn) of 2.0 million or less can maintain the processability. The polymer having the number average molecular weight (Mn) within the above "more preferable" or "most preferable" range is advantageous in terms of both the durability and processability.

The number average molecular weight (Mn) is measured in terms of polystyrene, referencing polystyrene as a standard substance, by using gel permeation chromatography (GPC) at a temperature of 140° C.

The polymer having the number average molecular weight (Mn) of 1.5 million or more is obtained by performing a polymerization at a low temperature (i.e., −50 to 100° C.) for a predetermined time (i.e., 30 minutes to 2 days), using a polymerization catalyst, or a first, a second, or a third polymerization catalyst composition, which will be described below.

Further, molecular weight distribution (Mw/Mn), represented by the ratio between the weight average molecular weight (Mw) and the number average molecular weight (Mn), is not particularly limited and may be selected as appropriate depending on the application thereof. Preferably, the molecular weight distribution is 5.0 or less, more preferably 4.0 or less, and most preferably 3.5 or less. The molecular weight distribution (Mw/Mn) exceeding 5.0 may make the physical property inhomogeneous. The molecular weight distribution (Mw/Mn) within the above "more preferable" or "most preferable" range is advantageous in terms of low-loss performance. Mw and Mn are obtained by gel permeation chromatography (GPC) using polystyrene as a standard substance, and the molecular weight distribution (Mw/Mn) is calculated from the results thereof.

The gel fraction in the polymer is not particular limited and may be selected as appropriate depending on the application thereof. However, the gel fraction is preferably 40% or less, more preferably 20% or less, and most preferably 10% or less.

The polymer having the gel fraction of 40% or less can prevent a significant deterioration of durability.

The polymer having the gel fraction within the above "more preferable" or "most preferable" range is advantageous in terms of durability.

The polymer having 40% or less gel fraction is obtained by performing a polymerization at a low temperature (−50 to 100° C.) for a predetermined time (30 minutes to 2 days), using the polymerization catalyst, or the first, second, or third polymerization catalyst composition, which will be described below.

The gel fraction (unit: %) as used herein means a value obtained by: measuring a differential refractive index (RI) Ss (unit: m second) of a standard sample (gel fraction=0%), which is a filtrate obtained by passing a THF solution of a polymer through a filter of GPC with a pore size of 0.45 μm; and using a calibration curve with the concentration (unit: mg/g) of the polymer in the THF solution on the horizontal axis and the differential refractive index (RI) Ss (unit: m second) on the vertical axis. Specifically, the gel fraction is calculated by passing a THF solution of a target polymer, for which the gel fraction is to be obtained, through the above filter to measure a differential refractive index (RI) Sx (unit: m second) of the solution; calculating the differential refractive index (RI) Ss (unit: m second) of the standard sample (gel fraction=0%) of the concentration (unit: mg/g) of the THF solution containing the target polymer for which the gel fraction is to be obtained, using the calibration curve prepared in advance; and substituting the measured Sx and the calculated Ss into the following expression (X):

Gel fraction (%)={($Ss×Sx$)/$Ss$}×100            (X)

A nitrogen content in the polymer is not particularly limited and may be selected as appropriate depending on the application thereof. However, the nitrogen content is preferably less than 0.02 mass % and more preferably 0 mass %.

The polymer having the nitrogen content of less than 0.02% or less allows its protein-derived nitrogen content to be also less than 0.02 mass %. This low content can minimize the protein-related gel generation, thereby reducing the gel fraction.

The nitrogen content can be measured, for example, by performing element analysis.

<Synthesized Polyisoprene>

-Cis-1,4 Bond Content-

The cis-1,4 bond content of the synthesized polyisoprene is not particularly limited and may be selected as appropriate depending on the application thereof. However, the bond content is preferably 96% or more, more preferably 97% or more, and most preferably 99% or more.

The synthesized polyisoprene having the cis-1,4 bond content of 96% or more can have polymer chains be oriented in an intended manner, thereby achieving sufficient strain-induced crystallinity. The synthesized polyisoprene having the cis-1,4 bond content exceeding 99% achieves strain-induced crystallinity sufficient for obtaining still higher durability.

-Trans-1,4 Bond Content-

The trans-1,4 bond content of the synthesized polyisoprene is not particularly limited and may be selected as appropriate depending on the application thereof. However, the bond content is preferably is 5% or less, more preferably 3% or less, and most preferably 1% or less.

The synthesized polyisoprene having the trans-1,4 bond content of 5% or less can develop strain-induced crystallinity.

-3,4-Vinyl Bond Content-

The 3,4-vinyl bond content of the synthesized polyisoprene is not particularly limited and may be selected as appropriate depending on the application thereof. The bond content is preferably is 5% or less, more preferably 3% or less, and most preferably 1% or less.

The synthesized polyisoprene having the 3,4-vinyl bond content of 5% or less can develop strain-induced crystallinity.

The synthesized polyisoprene having the 3,4-vinyl bond content of 5% or less can be obtained by polymerizing isoprene monomers at a low temperature (i.e., −50 to 100° C.) for a predetermined time (i.e., 30 minutes to 2 days), using the polymerization catalyst, or the first, second, or third polymerization catalyst composition, which will be discussed below.

-Method of Producing Synthesized Polyisoprene-

Next, a method of producing the synthesized polyisoprene will be described in detail. However, the producing method described in detail below is merely an example. The synthesized polyisoprene can be produced by polymerizing isoprene monomers in the presence of the polymerization catalyst or the polymerization catalyst composition.

The method of producing the synthesized polyisoprene includes at least a polymerization step, and further includes coupling, cleaning, and other steps arbitrarily selected as necessary.

--Polymerization Step--

The polymerization step is a step for polymerizing isoprene monomers.

In the polymerization step, isoprene monomers can be polymerized in a manner similar to that conventionally used in producing polymers using a coordination ion polymerization catalyst, except that the polymerization catalyst, or the first, second, or third polymerization catalyst composition, which will be discussed below, is used. The polymerization catalyst or the polymerization catalyst compositions used in the present invention will be described in detail below.

The catalyst that may be used in the polymerization step is the polymerization catalyst, or the first, second, or third polymerization catalyst composition, which will be described below.

An arbitrary method can be employed as the polymerization method including, for example, solution polymerization, suspension polymerization, liquid phase bulk polymerization, emulsion polymerization, vapor phase polymerization, and solid state polymerization. In addition, in the case of using a solvent for polymerization reaction, any solvent may be used that is inert to the polymerization reaction, including, for example, toluene, cyclohexane, n-hexane and mixtures thereof.

In the case of using a polymerization catalyst composition, the polymerization step can be carried out in either one of the following manners. That is, for example, (1) the components forming the polymerization catalyst composition may be provided in the polymerization reaction system containing isoprene monomers separately, to thereby prepare the polymerization catalyst composition in the reaction system, or (2) the polymerization catalyst composition prepared in advance may be provided into the polymerization reaction system. Further, the manner (2) also includes providing the metallocene complex (active species) activated by a co-catalyst.

Further, in the polymerization step, a terminator such as methanol, ethanol, and isopropanol may be used to stop the polymerization.

In the polymerization step, the polymerization reaction of the isoprene may preferably performed in an inert gas atmosphere, and preferably in nitrogen or argon atmosphere. The polymerization temperature of the polymerization reaction is not particularly limited, and preferably in a range of, for example, −100 to 200° C., and may also be set to temperatures around room temperature. An increase in the polymerization temperature may reduce the cis-1,4-selectivity in the polymerization reaction. The polymerization reaction is preferably performed under pressure in a range of 0.1 to 10.0 MPa so as to allow the isoprene to be sufficiently introduced into polymerization system. Further, the reaction time of the polymerization is not particularly limited, and may preferably be in a range of, for example, 1 second to 10 days, which may be selected as appropriate depending on the conditions such as the type of the catalyst, and the polymerization temperature.

---First Polymerization Catalyst Composition---

One example of the first polymerization catalyst composition contains at least one complex selected from the group consisting of: a metallocene complex represented by the general formulae (I), a metallocene complex represented by the following general formula (II), and a half metallocene cation complex represented by the general formula (III).

[Formula 1]

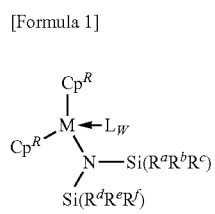

(I)

In the Formula (I), M represents a lanthanoid element, scandium, or yttrium; $Cp^R$ each independently represents a unsubstituted or substituted indenyl, $R^a$ to $R^f$ each independently represents a hydrogen atom or alkyl group having 1 to 3 carbon atoms; L represents a neutral Lewis base; and w represents an integer of 0 to 3.

[Formula 2]

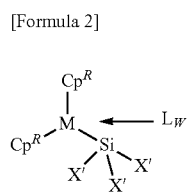

(II)

In the Formula (II), M represents a lanthanoid element, scandium, or yttrium; $Cp^R$ each independently represents an unsubstituted or substituted indenyl; X' represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3.

[Formula 3]

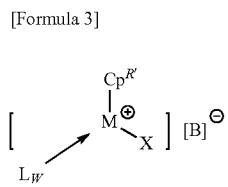

(III)

In the Formula (III), M represents a lanthanoid element, scandium, or yttrium; $Cp^{R'}$ represents an unsubstituted or substituted cyclopentadienyl, indenyl, fluorenyl; X represents a hydrogen atom, a halogen atom, an alkoxide group, a thiolate group, an amide group, a silyl group, or a hydrocarbon group having 1 to 20 carbon atoms; L represents a neutral Lewis base; w represents an integer of 0 to 3; and $[B]^-$ represents a non-coordinating anion.

The first polymerization catalyst composition may further include another component, such as a co-catalyst, which is contained in a regular polymerization catalyst composition containing a metallocene complex. Here, the metallocene complex is a complex compound having at least one or more cyclopentadienyl groups or derivative of cyclopentadienyl groups bonded to the central metal. In particular, a metallocene complex may be referred to as half metallocene complex when the number of cyclopentadienyl group or derivative thereof bonded to the central metal is one.

In the polymerization system, the concentration of the complex contained in the first polymerization catalyst composition is preferably in a range of 0.1 mol/L to 0.0001 mol/L.

In the metallocene complex represented by the general formulae (I) and (II) above, $Cp^R$ in the formulae represents an unsubstituted or substituted indenyl group. $Cp^R$ having an indenyl ring as a basic skeleton may be represented by $C_9H_{7-X}R_X$ or $C_9H_{11-X}R_X$. Here, X represents an integer of 0 to 7 or 0 to 11. R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. Examples of metalloid in the metalloid group include germyl (Ge), stannyl (Sn), and silyl (Si). The metalloid group preferably has a hydrocarbyl group, and examples of such a hydrocarbyl group are similar to those listed above. Specific example of the metalloid group includes a trimethylsilyl group. Specific examples of the substituted indenyl group include 2-phenyl indenyl and 2-methyl indenyl group. Two $Cp^R$ in each of the general formulae (I) and (II) may be the same as or different from each other.

In the half metallocene cation complex represented by the general formula (III), $Cp^{R'}$ in the formula represents a substituted or unsubstituted cyclopentadienyl, indenyl, or fluorenyl group, with the substituted or unsubstituted indenyl group being preferred. $Cp^{R'}$ having a cyclopentadienyl ring as a basic skeleton is represented by $C_5H_{5-X}R_X$, wherein X represents an integer of 0 to 5. R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. Examples of metalloid in the metalloid group include germyl (Ge), stannyl (Sn), and silyl (Si). The metalloid group preferably has a hydrocarbyl group, and the examples of such a hydrocarbyl group are similar to those listed above. Specific examples of the metalloid group include a trimethylsilyl group. Specific examples of $Cp^{R'}$ having a cyclopentadienyl ring as a basic skeleton include the following:

[Formula 4]

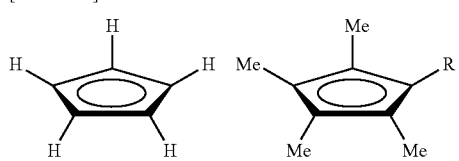

wherein R represents a hydrogen atom, a methyl group, or an ethyl group. In the general formula (III), $Cp^{R'}$ having an indenyl ring as a basic skeleton is defined in a manner similar to $Cp^R$ in the general formula (I), and preferred examples thereof are also defined in a manner similar to $Cp^R$ in the general formula (I).

In the general formula (III), $Cp^{R'}$ having the fluorenyl ring as a basic skeleton may be represented by $C_{13}H_{9-X}R_X$ or $C_{13}H_{17-X}R_X$, wherein X represents an integer of 0 to 9 or 0 to 17. Preferably, R each independently represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. Examples of metalloid in the metalloid group include germyl (Ge), stannyl (Sn), and silyl (Si). The metalloid group preferably has a hydrocarbyl group, and the examples of such a hydrocarbyl group are similar to those listed above. Specific examples of the metalloid group include a trimethylsilyl group.

The central metal represented by M in the general formulae (I), (II), and (III) represents a lanthanoid element, scandium, or yttrium. The lanthanoid elements include 15 elements with atomic numbers 57 to 71, and may be any one of them. Preferred examples of the central metal represented by M include samarium (Sm), neodymium (Nd), praseodymium (Pr), gadolinium (Gd), cerium (Ce), holmium (Ho), scandium (Sc), and yttrium (Y).

The metallocene complex represented by the general formula (I) includes a silyl amide ligand represented by [—N(SiR$_3$)$_2$]. Groups represented by R ($R^a$ to $R^f$ in the general formula (I)) in the silyl amide ligand each independently represent a hydrogen atom or an alkyl group having 1 to 3 carbon atoms. It is preferred that at least one of $R^a$ to $R^f$ represents a hydrogen atom. With at least one of $R^a$ to $R^f$ being a hydrogen atom, the catalyst can be synthesized with ease, and the height around silicon can be reduced, thereby allowing the unconjugated olefin to be easily introduced. For the same reason, at least one of $R^a$ to $R^c$ is preferably a hydrogen atom, and at least one of $R^d$ to $R^f$ is more preferably a hydrogen atom. Further, the alkyl group is preferably a methyl group.

The metallocene complex represented by the general formula (II) includes a silyl ligand represented by [—SiX'$_3$]. X' in the silyl ligand represented by [—SiX'$_3$] is a group defined in a manner similar to X in the general formula (III) which will be described below, and preferred examples thereof are also defined in a manner similar to X in the general formula (III).

In the general formula (III), X represents a group selected from the group consisting of a hydrogen atom, a halogen atom, an alkoxide group, a thiolate group, an amide group, a silyl group, and a hydrocarbon group having 1 to 20 carbon atoms. Here, the alkoxy group may be any one of: aliphatic alkoxy groups, such as a methoxy group, an ethoxy group, a propoxy group, an n-butoxy group, an isobutoxy group, a sec-butoxy group, and a tert-butoxy group; and aryl oxide groups, such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group, with the 2,6-di-tert-butylphenoxy group being preferred.

In the general formula (III), the thiolate group represented by X may be any one of: aliphatic thiolate groups such as a thiomethoxy group, a thioethoxy group, a thiopropoxy group, a thio-n-butoxy group, a thioisobutoxy group, a thio-sec-butoxy group, and a thio-tert-butoxy group; and aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group, with the 2,4,6-triisopropylthiophenoxy group being preferred.

In the general formula (III), the amide group represented by X may be any one of: aliphatic amide groups such as a dimethyl amide group, a diethyl amide group, and a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tri-tert-butylphenyl amide group; and bistrialkylsilyl amide groups such as a bistrimethylsilyl amide group, with the bistrimethylsilyl amide group being preferred.

In the general formula (III), the silyl group represented by X may be any one of a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group, with the tris(trimethylsilyl)silyl group being preferred.

In the general formula (III), the halogen atom represented by X may be any one of a fluorine atom, a chlorine atom, a bromine atom, and an iodine atom, with the chlorine atom and the bromine atom being preferred. Specific examples of the hydrocarbon group having 1 to 20 carbon atoms include: linear or branched aliphatic hydrocarbon groups such as a methyl group, an ethyl group, an n-propyl group, an isopropyl group, an n-butyl group, an isobutyl group, a sec-butyl group, a tert-butyl group, a neopentyl group, a hexyl group, and an octyl group; aromatic hydrocarbon groups such as a phenyl group, a tolyl group, and a naphthyl group; aralkyl groups such as a benzyl group; and hydrocarbon groups such as a trimethylsilylmethyl group and a bistrimethylsilylmethyl group each containing a silicon atom, with the methyl group, the ethyl group, the isobutyl group, the trimethylsilylmethyl group, and the like being preferred.

In the general formula (III), X is preferably the bistrimethylsilyl amide group or the hydrocarbon group having 1 to 20 carbon atoms.

In the general formula (III), one example of the non-coordinating anion represented by [B]$^-$ is for example tetravalent boron anions. Examples of the tetravalent boron anion include tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, (triphenyl, pentafluorophenyl)borate, [tris(pentafluorophenyl), phenyl]borate, and tridecahydride-7,8-dicarbaundecaborate, with the tetrakis(pentafluorophenyl)borate being preferred.

The metallocene complexes represented by the general formulae (I) and (II) and the half metallocene cation complex represented by the general formula (III) may include 0 to 3, preferably 0 or 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When the complex contains multiple neutral Lewis bases represented by L, the bases L may be the same as or different from each other.

The metallocene complexes represented by the general formulae (I) and (II), and the half metallocene cation complex represented by the general formula (III) may be contained as monomers, or as dimers or multimers having two or more monomers.

The metallocene complex represented by the general formula (I) can be obtained by, for example, subjecting a lanthanoid trishalide, a scandium trishalide, or a yttrium trishalide to reaction in a solvent with a salt of indenyl (for example, a potassium salt or a lithium salt) and a salt of bis(trialkylsilyl)amide (for example, a potassium salt or a lithium salt). The reaction may be carried out at temperatures around room temperature, and thus the metallocene-based composite catalyst can be produced under mild conditions. The reaction time is arbitrary, but about several hours to several tens of hours. The reaction solvent is not particularly limited, and any solvent including, for example toluene, which is capable of dissolving the raw material and the product, can be preferably used. In the following, a reaction example for obtaining the metallocene complex represented by the general formula (I) is described.

[Formula 5]

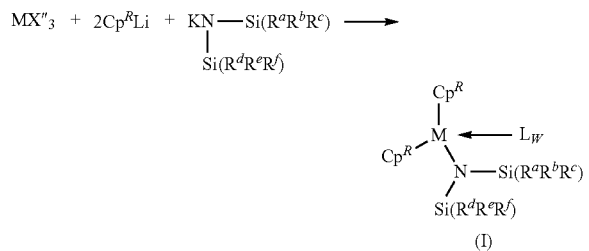

In the above formula, X″ represents a halide.

The metallocene complex represented by the general formula (II) can be obtained by, for example, subjecting a lanthanoid trishalide, a scandium trishalide, or a yttrium trishalide to reaction in a solvent with a salt of indenyl (for example, a potassium salt or a lithium salt) and a salt of silyl (for example, a potassium salt or a lithium salt). The reaction may be carried out at temperatures around room temperature, and thus the metallocene-based composite catalyst can be produced under mild conditions. The reaction time is arbitrary, but about several hours to several tens of hours. The reaction solvent is not particularly limited, but is preferably a solvent capable of dissolving the raw material and the product. Toluene may be for example used. In the following, a reaction example for obtaining the metallocene complex represented by the general formula (II) is described.

[Formula 6]

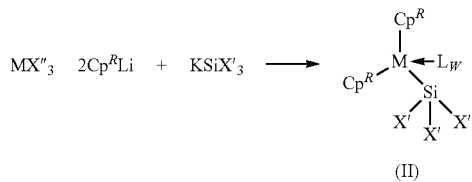

In the above formula, X″ represents a halide.

The half metallocene cation complex represented by the general formula (III) can be obtained by, for example, the following reaction:

[Formula 7]

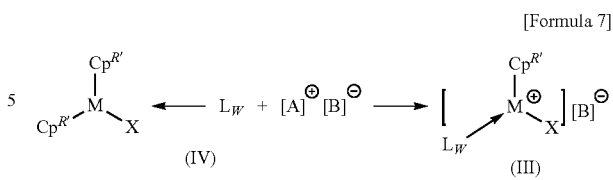

In formula (IV), M represents a lanthanoid element, scandium, or yttrium; $Cp^{R'}$ independently represents an unsubstituted or substituted cyclopentadienyl, indenyl, or fluorenyl; X represents a hydrogen atom, a halogen atom, an alkoxide group, a thiolate group, an amide group, a silyl group, or a hydrocarbon group having 1 to 20 carbon atoms; L represents a neutral Lewis base; and w represents an integer of 0 to 3. Further, in the general formula $[A]^+[B]^-$ representing an ionic compound, $[A]^+$ represents a cation; and $[B]^-$ represents a non-coordinating anion.

Examples of the cation represented by $[A]^+$ include a carbonium cation, an oxonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation. Specific examples of the tri(substituted phenyl)carbonium cation include a tri(methylphenyl)carbonium cation. Examples of the amine cation include: trialkylammonium cations such as a trimethylammonium cation, a triethylammonium cation, a tripropylammonium cation, and a tributylammonium cation; N,N-dialkylanilinium cations such as a N,N-dimethylanilinium cation, a N,N-diethylanilinium cation, and a N,N-2,4,6-pentamethylanilinium cation; and dialkylammonium cations such as a diisopropylammonium cation and a dicyclohexylammonium cation. Examples of the phosphonium cation include triarylphosphonium cations such as a triphenylphosphonium cation, a tri(methylphenyl)phosphonium cation, and a tri(dimethylphenyl)phosphonium cation. Of those cations, the N,N-dialkylanilinium cations or the carbonium cations are preferred, and the N,N-dialkylanilinium cations are particularly preferred.

The ionic compound, represented by the general formula $[A]^+[B]^-$, used in the above reaction is a compound obtained by combining any one selected from the non-coordinating anions described above and any one selected from the cations described above. Preferred examples thereof include N,N-dimethylanilinium tetrakis(pentafluorophenyl)borate and triphenylcarbonium tetrakis(pentafluorophenyl)borate. The ionic compound represented by the general formula $[A]^+[B]^-$ is added to the metallocene complex in an amount of preferably 0.1-fold mol to 10-fold mol and more preferably in an amount of about 1-fold mol. When the half metallocene cation complex represented by the general formula (III) is used in polymerization reaction, the half metallocene cation complex represented by the general formula (III) may be supplied to the polymerization system by itself; or alternatively, the compound represented by the general formula (IV) and the ionic compound represented by the general formula $[A]^+[B]^-$ may be separately supplied to the polymerization system, to thereby form the half metallocene cation complex represented by the general formula (III) in the reaction system. In addition, the half metallocene cation complex represented by the general formula (III) may be formed in the reaction system by using the metallocene complex represented by the general formula (I) or (II) and the ionic compound represented by the general formula [A]⁺[B]⁻ in combination.

Structures of the metallocene complex represented by the general formula (I) and (II) and the half metallocene cation complex represented by the general formula (III) are preferably determined by X-ray crystallography.

The co-catalyst that can be contained in the first polymerization catalyst composition may be arbitrarily selected from components used as the co-catalyst for a regular polymerization catalyst composition containing a metallocene complex. Preferred examples of the co-catalyst include aluminoxanes, organic aluminum compounds, and the above ionic compounds. These co-catalysts may be contained alone or in combination of two or more.

The aluminoxane is preferably an alkyl aluminoxane. Examples of the alkyl aluminoxane include methyl aluminoxane (MAO) and modified methyl aluminoxanes. One preferred example of the modified methylaluminoxane includes MMAO-3A (manufactured by Tosoh Finechem Corporation). The content of aluminoxane in the first polymerization catalyst composition is preferably about 10 to 1,000, or more preferably about 100, at an element ratio (Al/M) of the aluminum element Al of the aluminoxane to the center metal M of the metallocene complex.

A preferred example of the organic aluminum compounds is represented by a general formula AlRR'R" (wherein R and R' each independently represent a hydrocarbon group of C1 to C10 or a hydrogen atom, and R" is a hydrocarbon group of C1 to C10). Examples of the organic aluminum compound include a trialkyl aluminum, a dialkyl aluminum chloride, an alkyl aluminum dichloride, and a dialkyl aluminum hydride, with the trialkyl aluminum being preferred. Further, examples of the trialkyl aluminum include triethyl aluminum and triisobutyl aluminum. The content of the organic aluminum compound in the above polymerization catalyst composition is preferably 1-fold mol to 50-fold mol and more preferably about 10-fold mol, relative to the metallocene complex.

In the polymerization catalyst composition, the metallocene complex represented by the general formulae (I) and (II) and the half metallocene complex represented by the general formula (III) may be combined with an appropriate co-catalyst, to thereby increase the cis-1,4 bond content and the molecular weight of a polymer to be obtained.

---Second Polymerization Catalyst Composition---

Next, the second polymerization catalyst composition will be described.

A preferred example of the second polymerization catalyst composition may include:

component (A): a rare earth element compound or a reactant of the rare earth element compound and a Lewis base, with no bond formed between the rare earth element and carbon;

component (B): at least one selected from a group consisting of: an ionic compound (B-1) composed of a non-coordinating anion and a cation; an aluminoxane (B-2); and at least one kind of halogen compound (B-3) from among a Lewis acid, a complex compound of a metal halide and a Lewis base, and an organic compound containing active halogen. Further, if the second polymerization catalyst composition contains at least one kind of the ionic compound (B-1) and the halogen compound (B-3), the polymerization catalyst composition further contains:

component (C): an organic metal compound represented by the following general formula (X):

$$YR^1_a R^2_b R^3_c \quad (X)$$

wherein: Y is a metal selected from Group 1, Group 2, Group 12, and Group 13 of the periodic table; R1 and R2 are the same or different hydrocarbon groups each having 1 to 10 carbon atoms or a hydrogen atom; and R3 is a hydrocarbon group having 1 to 10 carbon atoms, in which R3 may be the same as or different from R1 or R2 above, with a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table.

The second polymerization catalyst composition used in the producing method is required to contain the above components (A) and (B), and if the polymerization catalyst composition contains at least one of the above ionic compound (B-1) and halogen compound (B-3), then it is further required to contain an organometallic compound represented by the following formula:

$$YR^1_a R^2_b R^3_c \quad (X)$$

wherein: Y is a metal selected from Group 1, Group 2, Group 12, and Group 13 of the periodic table; R1 and R2 are the same or different hydrocarbon groups each having 1 to 10 carbon atoms or a hydrogen atom; and R3 is a hydrocarbon group having 1 to 10 carbon atoms, in which R3 may be the same as or different from R1 or R2 above, with a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table.

The ionic compound (B-1) and the halogen compound (B-3) do not have carbon atoms to be fed to the component (A), and thus the component (C) becomes necessary as a source of feeding carbon to the component (A). Here, the polymerization catalyst composition still may include the component (C) even if the polymerization catalyst composition includes the aluminoxane (B-2). Further, the second polymerization catalyst composition may further include another component such as a co-catalyst, which is contained in a regular general rare earth element compound-based polymerization catalyst composition.

In the polymerization system, the concentration of the component (A) contained in the second polymerization catalyst composition is preferably in a range of 0.1 to 0.0001 mol/L.

The component (A) contained in the second polymerization catalyst composition is a rare earth element compound or a reactant of the rare earth element compound and a Lewis base. Here, the rare earth element compound and the reactant of the rare earth element compound and a Lewis base do not have a direct bond of the rare earth element and carbon. When the rare earth element compound or a reactant thereof does not have a direct bond formed between a rare earth element and carbon, the resulting compound is stable and easy to handle. Here, the rare earth element compound refers to a compound containing a lanthanoid element, scandium, or yttrium. The lanthanoid elements include elements with atomic numbers 57 to 71 of the periodic table. Specific examples of the lanthanoid element include lanthanum, cerium, praseodymium, neodymium, promethium, samarium, europium, gadolinium, terbium, dysprosium, holmium, erbium, thulium, ytterbium, and lutetium. These components (A) may be contained alone or in combination of two or more.

The rare earth element compound is preferably composed of a rare earth metal of a bivalent or trivalent salt or of a complex compound, and further preferably a rare earth element compound containing at least one ligand selected from a hydrogen atom, a halogen atom, and an organic compound residue. Further, the rare earth element compound or the reactant of the rare earth element compound and the Lewis base is represented by the following general formula (XI) or (XII):

(XI)

(XII)

wherein: M11 represents a lanthanoid element, scandium, or yttrium; X11 each independently represent a hydrogen atom, a halogen atom, an alkoxy group, a thiolate group, an amide group, a silyl group, an aldehyde residue, a ketone residue, a carboxylic acid residue, a thicarboxylic acid residue, or a phosphorous compound residue; L11 represents a Lewis base; and w represents 0 to 3.

Specific examples of a group (ligand) to form a bond to the rare earth element of the rare earth element compound include: a hydrogen atom; aliphatic alkoxy groups such as a methoxy group, an ethoxy group, a propoxy group, an n-butoxy group, an isobutoxy group, a sec-butoxy group, and a tert-butoxy group; aromatic alkoxy groups such as a phenoxy group, a 2,6-di-tert-butylphenoxy group, a 2,6-diisopropylphenoxy group, a 2,6-dineopentylphenoxy group, a 2-tert-butyl-6-isopropylphenoxy group, a 2-tert-butyl-6-neopentylphenoxy group, and a 2-isopropyl-6-neopentylphenoxy group; aliphatic thiolate groups such as thiomethoxy group, a thioethoxy group, a thiopropoxy group, a thio-n-butoxy group, a thioisobutoxy group, a thio-sec-butoxy group, and a thio-tert-butoxy group; aryl thiolate groups such as a thiophenoxy group, a 2,6-di-tert-butylthiophenoxy group, a 2,6-diisopropylthiophenoxy group, a 2,6-dineopentylthiophenoxy group, a 2-tert-butyl-6-isopropylthiophenoxy group, a 2-tert-butyl-6-thioneopentylphenoxy group, a 2-isopropyl-6-thioneopentylphenoxy group, and a 2,4,6-triisopropylthiophenoxy group; aliphatic amide groups such as a dimethyl amide group, a diethyl amide group, a diisopropyl amide group; arylamide groups such as a phenyl amide group, a 2,6-di-tert-butylphenyl amide group, a 2,6-diisopropylphenyl amide group, a 2,6-dineopentylphenyl amide group, a 2-tert-butyl-6-isopropylphenyl amide group, a 2-tert-butyl-6-neopentylphenyl amide group, a 2-isopropyl-6-neopentylphenyl amide group, and a 2,4,6-tert-butylphenyl amide group; bistrialkylsilyl amide groups such as a bistrimethylsilyl amide group; silyl groups such as a trimethylsilyl group, a tris(trimethylsilyl)silyl group, a bis(trimethylsilyl)methylsilyl group, a trimethylsilyl(dimethyl)silyl group, and a triisopropylsilyl(bistrimethylsilyl)silyl group; halogen atoms such as a fluorine atom, a chlorine atom, a bromine atom, and an iodine atom. Other examples may include: residues of aldehyde such as salicylaldehyde, 2-hydroxy-1-naphthaldehyde, and 2-hydroxy-3-naphthaldehyde; residues of hydroxyphenone such as 2'-hydroxyacetophenone, 2'-hydroxybutyrophenone, and 2'-hydroxypropiophenone; residues of diketone such as acetylacetone, benzoylacetone, propionylaceton, isobutyl acetone, valerylacetone, and ethylacetylacetone; residues of an carboxylic acid such as an isovaleric acid, a caprylic acid, an octanoic acid, a lauric acid, a myristic acid, a palmitic acid, a stearic acid, an isostearic acid, an oleic acid, a linoleic acid, a cyclopentanecarboxylic acid, a naphthenic acid, an ethylhexanoic acid, a pivalic acid, a versatic acid (trade name of a product manufactured by Shell Chemicals Japan Ltd., a synthetic acid composed of a mixture of C10 monocarboxylic acid isomers), a phenylacetic acid, a benzoic acid, 2-naphthoate acid, a maleic acid, and a succinic acid; residues of thicarboxylic acid such as a hexanethioic acid, 2,2-dimethylbutanethioic acid, a decanethioic acid, and a thiobenzoic acid; residues of phosphoric acid ester such as a phosphoric acid dibutyl, a phosphoric acid dipentyl, a phosphoric acid dihexyl, a phosphoric acid diheptyl, a phosphoric acid dioctyl, phosphoric acid bis(2-ethylhexyl), a phosphoric acid bis(1-methylheptyl), a phosphoric acid dilauryl, a phosphoric acid dioleyl, a phosphoric acid diphenyl, a phosphoric acid bis(p-nonylphenyl), a phosphoric acid bis(polyethylene glycol-p-nonylphenyl), a phosphoric acid (butyl)(2-ethylhexyl), a phosphoric acid(1-methylheptyl)(2-ethylhexyl), and a phosphoric acid(2-ethylhexyl)(p-nonylphenyl); residues of phosphonic acid ester such as a 2-ethylhexyl phosphonic acid monobutyl, a 2-ethylhexyl phosphonic acid mono-2-ethylhexyl, a phenylphosphonic acid mono-2-ethylhexyl, a 2-ethylhexyl phosphonic acid mono-p-nonylphenyl, a phosphonic acid mono-2-ethylhexyl, a phosphonic acid mono-1-methylheptyl, a and phosphonic acid mono-p-nonylphenyl; residues of phosphinic acid such as a dibutylphosphinic acid, a bis(2-ethylhexyl) phosphinic acid, a bis(1-methylheptyl)phosphinic acid, a dilauryl phosphinic acid, a dioleyl phosphinic acid, a diphenyl phosphinic acid, a bis(p-nonylphenyl)phosphinic acid, a butyl(2-ethylhexyl) phosphinic acid, (2-ethylhexyl)(2-methylhexyl)(1-methylheptyl)phosphinic acid, an (2-ethylhexyl)(p-nonylphenyl) phosphinic acid, a butyl phosphinic acid, 2-ethylhexyl phosphinic acid, a 1-methylheptyl phosphinic acid, an oleyl phosphinic acid, a lauryl phosphinic acid, a phenyl phosphinic acid, and a p-nonylphenyl phosphinic acid. These ligands may be used alone or in combination of two or more.

As to the component (A) used in the second polymerization catalyst composition, examples of the Lewis base to react with the rare earth element compound may include: tetrahydrofuran; diethyl ether; dimethylaniline; trimethylphosphine; lithium chloride, neutral olefins, and neutral diolefins. Here, in the case where the rare earth element compound reacts with a plurality of Lewis bases (in the case where w is 2 or 3 in Formulae (XI) and (XII)), the Lewis base $L^{11}$ in each Formula may be the same as or different from each other.

The component (B) contained in the second polymerization catalyst composition is at least one compound selected from a group consisting of: an ionic compound (B-1); an aluminoxane (B-2); and a halogen compound (B-3). The total content of the component (B) contained in the second polymerization catalyst composition is preferably in a range of 0.1-fold mol to 50-fold mol, relative to the component (A).

The ionic compound represented by (B-1) is formed of non-coordinating anion and cation, and an example thereof includes: an ionic compound that reacts with the component (A), i.e., a rare earth element compound or a reactant of a rare earth element compound and a Lewis base, so as to form a cationic transition metal compound. Here, examples of the non-coordinating anion include: tetraphenyl borate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, (triphenyl, pentafluorophenyl)borate, [tris (pentafluorophenyl), phenyl]borate, and tridecahydride-7,8-dicarbaundecaborate. Meanwhile, examples of the cation may include a carbonium cation, an oxonium cation, an ammonium cation, a phosphonium cation, a cycloheptatrienyl cation, and a ferrocenium cation containing a transition metal. Specific examples of the carbonium cation include trisubstituted carbonium cations such as a triphenylcarbonium cation and a tri(substituted phenyl)carbonium cation, and more specific examples of the tri(substituted phenyl) carbonium cation include a tri(methylphenyl)carbonium cation and a tri(dimethylphenyl)carbonium cation. Examples of the ammonium cation include: trialkylammonium cations such as a trimethylammonium cation, a triethylammonium cation, a tripropylammonium cation, and a tributylammonium cation (such as a tri(n-butyl)ammonium cation); N,N-dialkylanilinium cations such as a N,N-dimethylanilinium cation, N,N-diethylanilinium cation, and a N,N-2,4,6-pentamethylanilinium cation; and dialkylammonium cations such as a diisopropylammonium cation and a dicyclohexylammonium cation. Specific examples of the phosphonium cation include triarylphosphonium cations such as a triphenylphosphonium cation, a tri(methylphenyl)phosphonium cation, and a tri(dimethylphenyl)phosphonium cation. Therefore, the ionic compound may preferably be a compound obtained by combining any one selected from the non-coordinating anions described above and any one selected from the cations described above. Specific examples thereof preferably include a N,N-dimethylanilinium tetrakis(pentafluorophenyl)borate and a triphenylcarbonium tetrakis(pentafluorophenyl)borate. These ionic compounds may be contained alone or in combination of two or more. The content of the ionic compound in the second polymerization catalyst composition is preferably 0.1-fold mol to 10-fold mol, and more preferably about 1-fold mol, with respect to the component (A).

The aluminoxane represented by (B-2) is a compound obtained by contacting an organic aluminum compound with a condensation agent, and examples thereof include: a chain type aluminoxane or a cyclic aluminoxane, both having a repeating unit represented by the general formula (—Al(R') O—), wherein R' is a hydrocarbon group having 1 to 10 carbon atoms and may be partly substituted with halogen atom and/or alkoxy group, and the polymerization degree of the repeating unit is preferably at least 5, more preferably at least 10. Here, specific examples of R' include a methyl group, an ethyl group, a propyl group, and isobutyl group, with the methyl group being preferred. Further, examples of the organic aluminum compound used as a raw material of the aluminoxane may include: trialkyl aluminums such as trimethyl aluminum, triethyl aluminum, triisobutyl aluminum and the like; and mixtures thereof, with the trimethyl aluminum being particularly preferred. For example, an aluminoxane obtained by using a mixture of trimethyl aluminum and tributyl aluminum as a raw material can be suitably used. The content of aluminoxane in the second polymerization catalyst composition is preferably about 10 to 1,000 at an element ratio (Al/M) of the aluminum element Al of the aluminoxane to the rare earth element M forming the component (A).

The halogen compound represented by (B-3) includes at least one of: a Lewis acid; a complex compound of a metal halide and a Lewis base; and an organic compound containing active halogen, and is capable of reacting with, for example, the rare earth element compound as the component (A) or with the reactant resulting from Lewis base and the rare earth element compound, so as to form a compound, such as a cationic transition metal compound, halogenated transition metal compound or a compound with a charge-deficient transition metal center. The total content of the halogen compound in the second polymerization catalyst composition is preferably 1-fold mol to 5-fold mol, relative to the component (A).

Examples of the Lewis acid may include: a boron-containing halogen compound such as $B(C_6F_5)_3$ and an aluminum-containing halogen compound such as $Al(C_6F_5)_3$, and may also include a halogen compound containing an element of Group III, Group IV, Group V, Group VI, and Group VIII of the periodic table. Preferred examples thereof include an aluminum halide or an organometallic halide. Preferred examples of the halogen element include chlorine and bromine. Specific examples of the Lewis acid include: a methyl aluminum dibromide; a methyl aluminum dichloride; an ethyl aluminum dibromide; an ethyl aluminum dichloride; a butyl aluminum dibromide; a butyl aluminum dichloride; a dimethyl aluminum bromide; a dimethyl aluminum chloride; a diethyl aluminum bromide; a diethyl aluminum chloride; a dibutyl aluminum bromide; a dibutyl aluminum chloride; a methyl aluminum sesquibromide; a methyl aluminum sesquichloride; a ethyl aluminum sesquibromide; an ethyl aluminum sesquichloride; a dibutyltin dichloride; an aluminum tribromide; an antimony trichloride; an antimony pentachloride; a phosphorus trichloride; a phosphorus pentachloride; a tin tetrachloride; a titanium tetrachloride; and tungsten hexachloride, with the diethyl aluminum chloride, the ethyl aluminum sesquichloride, the ethyl aluminum dichloride, the diethyl aluminum bromide, the ethyl aluminum sesquibromide, and the ethyl aluminum dibromide being particularly preferred.

Preferred examples of the metal halide forming a complex compound of the metal halide and a Lewis base include: a beryllium chloride, a beryllium bromide; a beryllium iodide; a magnesium chloride; a magnesium bromide; a magnesium iodide; a calcium chloride; a calcium bromide; a calcium iodide; a barium chloride; a barium bromide; a barium iodide; a zinc chloride; a zinc bromide; a zinc iodide; a cadmium chloride; a cadmium chloride; a cadmium bromide; a cadmium iodide; a mercury chloride; a mercury bromide; a mercury iodide; a manganese chloride; a manganese bromide; a manganese iodide; a rhenium chloride; a rhenium bromide; a rhenium iodide; a copper chloride; a copper bromide; a copper iodide; a silver chloride; a silver bromide; a silver iodide; a gold chloride; a gold iodide; and a gold bromide, with the magnesium chloride, the calcium chloride, the barium chloride, the manganese chloride, the zinc chloride, and the copper chloride being preferred, and the magnesium chloride, the manganese chloride, the zinc chloride, and the copper chloride being particularly preferred.

Preferred examples of the Lewis base forming a complex compound of the metal halide and the Lewis base include: a phosphorus compound; a carbonyl compound; a nitrogen compound; an ether compound; and an alcohol. Specific examples thereof include: a tributyl phosphate; a tri-2-ethylhexyl phosphate; a triphenyl phosphate; a tricresyl phosphate; a triethylphosphine; a tributylphosphine; a triphenylphosphine; a diethylphosphinoethane; an acetylacetone; a benzoylacetone; a propionitrileacetone; a valerylacetone; an ethylacetylacetone; a methyl acetoacetate; an ethyl acetoacetate; a phenyl acetoacetate; a dimethyl malonate; a diphenyl malonate; an acetic acid; an octanoic acid; a 2-ethylhexoic acid; an oleic acid; a stearic acid; a benzoic acid; a naphthenic acid; a versatic acid; a triethylamine; a N,N-dimethylacetamide; a tetrahydrofuran; a diphenyl ether; a 2-ethylhexyl alcohol; an oleyl alcohol;

stearyl alcohol; a phenol; a benzyl alcohol; a 1-decanol; and a lauryl alcohol, with the tri-2-ethylhexyl phosphate, the tricresyl phosphate; the acetylacetone, the 2-ethylhexoic acid, the versatic acid, the 2-ethylhexyl alcohol; the 1-decanol; and the lauryl alcohol being preferred.

The Lewis base is subjected to reaction with the metal halide in the proportion of 0.01 to 30 mol, preferably 0.5 to 10 mol, per 1 mol of the metal halide. The use of the reactant obtained from the reaction of the Lewis base can reduce residual metal in the polymer.

An example of the organic compound containing the active halogen includes benzyl chloride.

The component (C) that may be contained in the second polymerization catalyst composition is an organic compound represented by the general formula (X):

$$YR^1{}_a R^2{}_b R^3{}_c \tag{X}$$

wherein: Y is a metal selected from Group 1, Group 2, Group 12, and Group 13 of the periodic table; R1 and R2 are the same or different hydrocarbon groups each having 1 to 10 carbon atoms or a hydrogen atom; and R3 is a hydrocarbon group having 1 to 10 carbon atoms, in which R3 may be the same as or different from R1 or R2 above, with a being 1 and b and c both being 0 when Y is a metal selected from Group 1 of the periodic table, a and b being 1 and c being 0 when Y is a metal selected from Group 2 and Group 12 of the periodic table, a, b, and c are all 1 when Y is a metal selected from Group 13 of the periodic table. The organic metallic compound is preferably an organic aluminum compound represented by the following general formula (Xa):

$$AlR^1 R^2 R^3 \tag{Xa}$$

wherein: $R^1$ and $R^2$ are the same or different hydrocarbon groups each having 1 to 10 carbon atoms or a hydrogen atom; and $R^3$ is a hydrocarbon group having 1 to 10 carbon atoms, in which $R^3$ may be the same as or different from $R^1$ or $R^2$ above. Examples of the organic aluminum compound of the general formula (X) include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride; a diisohexyl aluminum hydride, a dioctyl aluminum hydride, a diisooctyl aluminum hydride; an ethyl aluminum dihydride, a n-propyl aluminum dihydride, and an isobutyl aluminum dihydride, with the triethyl aluminum, the triisobutyl aluminum, the diethyl aluminum hydride, and the diisobutyl aluminum hydride being preferred. The organic aluminum compounds as the component (C) may be contained alone or in combination of two or more. The content of the organic aluminum compound in the second polymerization catalyst composition is preferably 1-fold mol to 50-fold mol, and more preferably about 10-fold mol, with respect to the component (A).

---Third Polymerization Catalyst Composition---

The third polymerization catalyst composition includes the metallocene-based composite catalyst below and boron anion, and further preferably includes another component such as a co-catalyst, which is contained in a regular polymerization catalyst composition containing a metallocene complex. The third polymerization catalyst composition is also referred to as two-component catalyst, which has the metallocene-based composite catalyst and boron anion. As is the case with the metallocene-based composite catalyst, the third polymerization catalyst composition further contains boron anion, which allows the content of each monomer component in the copolymer to be arbitrarily controlled.

---Metallocene Catalyst---

One example of the metallocene-based composite catalyst is represented by the following formula (A):

$$R_a MX_b QY_b \tag{A}$$

wherein: R each independently represents an unsubstituted or substituted indenyl group, the R being coordinated with M; M represent a lanthanoid element, scandium, or yttrium; X each independently represents hydrocarbon group having 1 to 20 carbon atoms, the X being μ-coordinated with M and Q; Q represents a Group 13 element in the periodic table; Y each independently represents a hydrocarbon group having 1 to 20 carbon atoms or a hydrogen atom, the Y being coordinated with Q; and a and b each are 2.

One preferred example of the above-described metallocene-based composite catalyst includes a metallocene-based composite catalyst represented by the following formula (XV):

[Formula 8]

(XV)

wherein: $M^1$ represents a lanthanoid element, scandium or yttrium; $Cp^R$ each independently represents a nonsubstituted or substituted indenyl group; $R^A$ and $R^B$ each independently represent a hydrocarbon group having 1 to 20 carbon atoms, the $R^A$ and $R^B$ each being μ-coordinated with $M^1$ and Al; and $R^C$ and $R^D$ each independently represent a hydrocarbon group having 1 to 20 carbon atoms or a hydrogen atom.

The use of the above metallocene-based polymerization catalyst enables the production of the polymer. The use of the metallocene-based composite compounds such as an aluminum-based catalyst can reduce or eliminate the amount of alkyl aluminum to be used in the step of synthesizing the polymer. The use of a conventional catalyst system would require a large amount of alkyl aluminum to be used in synthesizing a polymer. For example, to obtain high catalytic effect, the metallocene-based composite catalyst of the present invention requires alkyl aluminum in an amount of only about 5 equivalents, whereas a conventional catalyst system would require alkyl aluminum in an amount of at least 10 equivalents, relative to a metal catalyst.

In the metallocene-based composite catalyst, the metal represented by M in the formula (A) is a lanthanoid element, scandium, or yttrium. The lanthanoid elements include 15 elements with atomic numbers 57 to 71, and may be any one of them. Preferred examples of the central metal represented by M include samarium (Sm), neodymium (Nd), praseodymium (Pr), gadolinium (Gd), cerium (Ce), holmium (Ho), scandium (Sc), and yttrium (Y).

In the formula (A), R each independently represents an unsubstituted or substituted indenyl, the R being coordinated with the metal M. Specific examples of the substituted indenyl group include a 1,2,3-trimethyl indenyl group, a heptamethyl indenyl group, and a 1,2,4,5,6,7-hexamethyl indenyl group.

In the formula (A), Q represents a Group 13 element in the periodic table. Specific examples thereof include boron, aluminum, gallium, indium, and thallium.

In the formula (A), X each independently represents a hydrocarbon group having 1 to 20 carbon atoms, the X being μ-coordinated with M and Q. Here, examples of the hydrocarbon group having 1 to 20 carbon atoms include: a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group. The μ-coordination refers to a state of coordination which forms a crosslinked structure.

In the formula (A), Y each independently represents a hydrocarbon group having 1 to 20 carbon atoms or a hydrogen atom, the Y being coordinated with Q. Here, examples of the hydrocarbon group having 1 to 20 carbon atoms include, a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

In the formula (XV) above, the metal represented by $M^1$ is a lanthanoid element, scandium, or yttrium. The lanthanoid elements include 15 elements with atomic numbers 57 to 71, and may be any one of them. Preferred examples of the metal represented by $M^1$ include samarium (Sm), neodymium (Nd), praseodymium (Pr), gadolinium (Gd), cerium (Ce), holmium (Ho), scandium (Sc), and yttrium (Y).

In the formula (XV), $Cp^R$ represents an unsubstituted or substituted indenyl. $Cp^R$ having an indenyl ring as a basic skeleton may be represented by $C_9H_{7-X}R_X$ or $C_9H_{11-X}R_X$. Here, X represents an integer of 0 to 7 or 0 to 11. R each independently preferably represents a hydrocarbyl group or a metalloid group. The hydrocarbyl group preferably has 1 to 20 carbon atoms, more preferably 1 to 10 carbon atoms, and still more preferably 1 to 8 carbon atoms. Preferred specific examples of the hydrocarbyl group include a methyl group, an ethyl group, a phenyl group, and a benzyl group. Examples of metalloid in the metalloid group include germyl (Ge), stannyl (Sn), and silyl (Si). The metalloid group preferably has a hydrocarbyl group, and the examples of such a hydrocarbyl group are similar to those listed above. Specific example of the metalloid group includes a trimethylsilyl group.

Specific examples of the substituted indenyl group include 2-phenyl indenyl and 2-methyl indenyl group. Two $Cp^R$ in each of the general formulae (I) and (II) may be the same as or different from each other.

In the formula (XV), $R^A$ and $R^B$ each independently represent a hydrocarbon group having 1 to 20 carbon atoms, and the $R^A$ and $R^B$ being μ-coordinated with $M^1$ and $A^1$. Here, examples of the hydrocarbon group having 1 to 20 carbon atoms include, a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group. The μ-coordination refers to a state of coordination which forms a crosslinked structure.

In the formula (XV), $R^C$ and $R^D$ each independently represent a hydrocarbon group having 1 to 20 carbon atoms or a hydrogen atom. Here, examples of the hydrocarbon group having 1 to 20 carbon atoms include, a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

The metallocene-based composite catalyst can be obtained by, for example, reacting a metallocene complex with an organic aluminum compound represented by $AlR^K R^L R^M$ in a solvent. The metallocene complex is represented by the following formula (XVI):

[Formula 9]

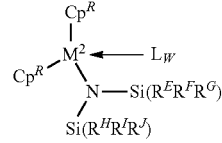

(XVI)

wherein $M^2$ represents a lanthanoid element, scandium, or yttrium; $Cp^R$ each independently represents an unsubstituted or substituted indenyl group; $R^E$ to $R^J$ each independently represent an alkyl group having 1 to 3 carbon atoms or a hydrogen atom; L represents a neutral Lewis base; and w represents an integer of 0 to 3. The reaction may be carried out at temperatures around room temperature, and thus the metallocene-based composite catalyst can be produced under mild conditions. The reaction time is arbitrary, but about several hours to several tens of hours. The reaction solvent is not particularly limited, but is preferably a solvent that is capable of dissolving the raw material and the product. Toluene and hexane may for example be used. The structure of the metallocene-based composite catalyst may preferably be determined by $^1$H-NMR or X-ray crystallography.

In the metallocene complex represented by the formula (XVI), $Cp^R$ is an unsubstituted indenyl or substituted indenyl, and is equivalent to $Cp^R$ in the formula (XV). Further, in the formula (XVI), the metal $M^2$ represents a lanthanoid element, scandium, or yttrium, which is equivalent to the metal $M^1$ in the formula (XV).

The metallocene complex represented by the formula (XVI) includes a silyl amide ligand represented by [—N(SiR$_3$)$_2$]. Groups represented by R ($R^E$ to $R^J$) in the silyl amide ligand each independently represent a hydrogen atom or an alkyl group having 1 to 3 carbon atoms. It is preferred that at least one of $R^E$ to $R^J$ represents a hydrogen atom. With at least one of $R^E$ to $R^J$ representing a hydrogen atom, the catalyst can be synthesized with ease. Further, the alkyl group is preferably a methyl group.

The metallocene complex represented by the above formula (XVI) further contains 0 to 3, preferably 0 or 1 neutral Lewis bases represented by L. Examples of the neutral Lewis base L include tetrahydrofuran, diethyl ether, dimethylaniline, trimethylphosphine, lithium chloride, neutral olefins, and neutral diolefins. When the complex includes a plurality of neutral Lewis bases represented by L, the neutral Lewis bases L may be the same as or different from each other.

The metallocene complex represented by the formula (XVI) may be contained as monomers, or as dimers or multimers having two or more monomers.

The organic aluminum compound to be used for generating the metallocene-based composite catalyst is represented by a general formula $AlR^K R^L R^M$, where $R^K$ and $R^E$ each independently represent a univalent hydrocarbon group having 1 to 20 carbon atoms or a hydrogen atom and $R^M$ represents a univalent hydrocarbon group having 1 to 20 carbon atoms, with the $R^M$ being either the same as or different from $R^K$ or $R^E$. Examples of the univalent hydrocarbon groups having 1 to 20 carbon atoms include a methyl group, an ethyl group, a propyl group, a butyl group, a pentyl group, a hexyl group, a heptyl group, an octyl group, a decyl group, a dodecyl group, a tridecyl group, a tetradecyl group, a pentadecyl group, a hexadecyl group, a heptadecyl group, and a stearyl group.

Specific examples of the organic aluminum compound include: a trimethyl aluminum, a triethyl aluminum, a tri-n-propyl aluminum, a triisopropyl aluminum, a tri-n-butyl aluminum, a triisobutyl aluminum, a tri-t-butyl aluminum, a tripentyl aluminum, a trihexyl aluminum, a tricyclohexyl aluminum, a trioctyl aluminum; a diethylaluminum hydride, a di-n-propyl aluminum hydride, a di-n-butyl aluminum hydride, a diisobutyl aluminum hydride, a dihexyl aluminum hydride; a diisohexyl aluminum hydride, a dioctyl aluminum hydride, a diisooctyl aluminum hydride; an ethyl aluminum dihydride, a n-propyl aluminum dihydride, and an isobutyl aluminum dihydride, with the triethyl aluminum, the triisobutyl aluminum, the diethyl aluminum hydride, and the diisobutyl aluminum hydride being preferred. These organic aluminum compounds may be contained alone or in combination of two or more. The amount of the organic aluminum compound to be used for generating the metallocene-based composite catalyst is preferably 1-fold mol to 50-fold mol, and more preferably about 10-fold mol, relative to the metallocene complex.

In the third polymerization catalyst composition, a specific example of the boron anion forming the two-component catalyst includes a tetravalent boron anion. Examples thereof may include: a tetraphenyl borate, a tetrakis(monofluorophenyl)borate, a tetrakis(difluorophenyl)borate, a tetrakis(trifluorophenyl)borate, a tetrakis(tetrafluorophenyl)borate, a tetrakis(pentafluorophenyl)borate, a tetrakis (tetrafluoromethylphenyl)borate, a tetra(tolyl)borate, a tetra(xylyl)borate, a (triphenyl, pentafluorophenyl)borate, a [tris(pentafluorophenyl), phenyl]borate, and a tridecahydride-7,8-dicarbaundecaborate, with the tetrakis(pentafluorophenyl) borate being preferred.

The boron anion may be used as an ionic compound combined with cation. Examples of the cation include a carbonium cation, an oxonium cation, an ammonium cation, an amine cation, a phosphonium cation, a cycloheptatrienyl cation, and a ferrocenium cation containing a transition metal. Examples of the carbonium cation include trisubstituted carbonium cations such as a triphenylcarbonium cation and a tri(substituted phenyl)carbonium cation. Specific examples of the tri(substituted phenyl)carbonium cation include a tri(methylphenyl)carbonium cation. Examples of the amine cation include: trialkylammonium cations such as a trimethylammonium cation, a triethylammonium cation, a tripropylammonium cation, and a tributylammonium cation; N,N-dialkylanilinium cations such as a N,N-dimethylanilinium cation, a N,N-diethylanilinium cation, and a N,N-2,4,6-pentamethylanilinium cation; and dialkylammonium cations such as a diisopropylammonium cation and a dicyclohexylammonium cation. Examples of the phosphonium cation include triarylphosphonium cations such as a triphenylphosphonium cation, a tri(methylphenyl)phosphonium cation, and a tri(dimethylphenyl)phosphonium cation. Of those cations, the N,N-dialkylanilinium cations or the carbonium cations are preferred, and the N,N-dialkylanilinium cations are particularly preferred. Therefore, preferred examples of the ionic compound include a N,N-dimethylanilinium tetrakis(pentafluorophenyl)borate and a triphenylcarbonium tetrakis(pentafluorophenyl)borate. The content of the ionic compound including a boron anion and a cation may preferably be added by 0.1-fold mol to 10-fold mol, and more preferably by about 1-fold mol, relative to the metallocene-based composite catalyst.

Although it is required to use the above metallocene-based composite catalyst and the above boron anion in the third polymerization catalyst composition, the presence of a boron anion in the reaction system for reacting the metallocene catalyst represented by the formula (XVI) with the organic aluminum compound would not allow the synthesis of the metallocene-based composite catalyst of the formula (XV). Accordingly, preparation of the above-described third polymerization catalyst composition requires the metallocene-based composite catalyst to be synthesized in advance and isolated and purified before combined with a boron anion.

Preferred examples of the co-catalyst that can be contained in the third polymerization catalyst composition may include aluminoxanes, in addition to the organic aluminum compound represented by $AlR^K R^L R^M$. The aluminoxane is preferably an alkyl aluminoxane. Examples of the alkyl aluminoxane include methyl aluminoxane (MAO) and modified methyl aluminoxanes. In addition, a preferred example of the modified methyl aluminoxane is MMAO-3A (manufactured by Tosoh Finechem Corporation). These aluminoxanes may be contained alone or in combination of two or more.

--Coupling Step--

The coupling step is a step for coupling at least parts (e.g., the end portions) of polymer chains of the synthesized polyisoprene obtained in the polymerization step through a coupling reaction.

In the coupling step, coupling reaction is preferably performed when the polymerization reaction reaches 100%.

The coupling agent used for the coupling reaction is not particularly limited and may be selected as appropriate depending on the application thereof. Examples the coupling agent include, for example, (i) a tin-containing compound, such as bis(maleic acid-1-octadecyl)dioctyltin(IV), (ii) an isocyanate compound, such as 4,4'-diphenylmethanediisocyanate, and (iii) an alkoxysilane compound, such as glycidylpropyltrimethoxysilane. These coupling agents may be used alone or in combination of two or more thereof.

Among them, bis(maleic acid-1-octadecyl)dioctyltin(IV) is preferable in terms of its high reaction efficiency and low gel-formation property.

The coupling reaction can increase the number average molecular weight (Mn).

The reaction temperature of the coupling reaction is not particularly limited and may be selected as appropriate depending on the application thereof. The temperature is, however, preferably 10 to 100° C., and more preferably 20 to 80° C.

The reaction temperature of 10° C. or higher can prevent a significant decrease in reaction rate, and that of 100° C. or lower can prevent the gelation of polymers.

The reaction time of the coupling reaction is not particularly limited and may be selected as appropriate depending on the application thereof. The reaction time is, however, preferably 10 minutes to 1 hour.

The reaction time of less than 10 minutes may fail to allow the reaction to proceed satisfactorily, and the reaction time exceeding 1 hour may cause the polymer to gel.

--Cleaning Step--

The cleaning step is a step for cleaning the polyisoprene obtained in the polymerization step. The medium used in the cleaning is not particularly limited and may be selected as appropriate depending on the application thereof. Examples of the medium include methanol, ethanol, and isopropanol. When a catalyst derived from a Lewis acid is used as the polymerization catalyst, an acid (e.g. hydrochloric acid, sulfuric acid, and nitric acid) may be added to the solvent. The amount of acid that may be added is preferably 15 mol % or less relative to the solvent. An acid added by the amount exceeding 15 mol % can remain in the polymer, potentially causing adverse effects on the reaction during kneading and vulcanization.

This cleaning step suitably decreases the amount of residual catalyst remaining in the synthesized polyisoprene.

<Isoprene Copolymer>

-Compounds Other than Isoprene-

Compounds other than isoprene that may be copolymerized with isoprene are not particularly limited and may be selected as appropriate depending on the application thereof. Examples of such compounds include, for example, a conjugated diene compound, such as 1,3-butadiene, 1,3-pentadiene, 2,3-dimethyl butadiene; aromatic vinyl compound, such as styrene; and an unconjugated olefin compound, such as ethylene, propylene, 1-butene, 1-pentene, 1-hexene, 1-heptene, and 1-octene. These may used alone or in combination of two or more thereof.

Among them, butadiene and styrene are preferable in terms of controlling the molecular weight.

-Cis-1,4 Bond Content-

The cis-1,4 bond content in a unit derived from the isoprene in the isoprene copolymer is not particularly limited and may be selected as appropriate depending on the application thereof. The bond content is, however, preferably 90% or more, more preferably 95% or more, and most preferably 98% or more.

The isoprene copolymer having cis-1,4 bond content of 90% or more can develop strain-induced crystallinity satisfactorily The isoprene copolymer having the cis-1,4 bond content within the above "more preferable" or "most preferable" range is advantageous in terms of improved durability related to the strain-induced crystallinity.

It should be noted that the cis-1,4 bond content here is not the ratio of the cis-1,4 bond to the whole isoprene copolymer but is the amount of the cis-1,4 bond in the unit derived from the isoprense.

-Trans-1,4 Bond Content-

The trans-1,4 bond content of the isoprene copolymer is not particularly limited and may be selected as appropriate depending on the application thereof. The bond content is, however, preferably 10% or less, and more preferably 5% or less.

The isoprene copolymer having trans-1,4 bond content of 10% or less can develop strain-induced crystallinity satisfactorily.

The isoprene copolymer having the trans-1,4 bond content within the above "more preferable" range is advantageous in terms of improved durability related to the strain-induced crystallinity.

-3,4-Vinyl Bond Content-

The 3,4-vinyl bond content of isoprene in a unit derived from the isoprene in the isoprene copolymer is not particularly limited and may be selected as appropriate depending on the application thereof. The bond content is, however, preferably 5% or less, more preferably 2% or less.

The isoprene copolymer having the 3,4-vinyl bond content of 5% or less can develop strain-induced satisfactorily.

The isoprene copolymer having the cis-3,4-vinyl bond content within the above "preferable" or "more preferable" range is advantageous in terms of durability related to the strain-induced crystallinity.

-Content of Isoprene-Derived Unit in Isoprene Copolymer-

The content of the unit derived from isoprene in the isoprene copolymer is not particularly limited and may be selected as appropriate depending on the application thereof. The content is, however, preferably 5 to 95 mol %.

The isoprene copolymer having 5 mol % or more isoprene-derived unit allows the isoprene to exhibit its properties satisfactorily, and that having 95 mol % or less isoprene-derived unit allows the copolymer component other than isoprene to exhibit the properties satisfactorily. For these reasons, the content of isoprene-derived unit being 5 to 95 mol % is preferable.

-Chain Structure-

The chain structure is not particularly limited and may be selected as appropriate depending on the application thereof. Examples of the chain structure include, for example, a block copolymer, a random copolymer, a tapered copolymer, and an alternating copolymer.

--Block Copolymer--

The structure of the block copolymer is any one of (A-B)x, A-(B-A) x, and B-(A-B) x, wherein A is a block portion composed of monomer units of isoprene, B is a block portion composed of monomer units of a compound other than isoprene, and x is an integer of 1 or more. A block copolymer containing multiple (A-B) or (B-A) structures is referred to as a multi-block copolymer.

--Random Copolymer--

The structure of the random copolymer has a random arrangement of monomer units of isoprene and monomer units of a compound other than isoprene.

--Tapered Copolymer--

The tapered copolymer contains random copolymers and block copolymer in a mixed manner. Specifically, the tapered copolymer contains at least either a block portion (or block structure) composed of monomer units of isoprene or a block portion composed of monomer units of a compound other than isoprene, and a random portion (or random structure) composed of monomer units of isoprene and those of a compound other than isoprene that are randomly arranged.

The structure of the tapered copolymer shows that the composition of the isoprene component and the compound component other than isoprene has continuous or discontinuous distribution.

--Alternating Copolymer--

The alternating copolymer contains isoprene units and units of a compound other than isoprene that are arranged alternately. Specifically the structure of the alternating copolymer has a molecular chain structure of -ABABABAB-, wherein A represents a monomer unit of isoprene and B represents a monomer unit of a compound other than isoprene.

-Method of Producing Isoprene Copolymer-

Next, a method of producing the isoprene copolymer will be described in detail. However, the manufacturing method described in detail below is merely an example. The isoprene copolymer can be produced by polymerizing isoprene monomers and monomers of a compound other than isoprene in the presence of a polymerization catalyst or a polymerization catalyst composition.

The method of producing the isoprene copolymer of the present invention includes at least a polymerization step, and further includes coupling, cleaning, and other steps appropriately selected as necessary.

--Polymerization Step--

The polymerization step is a step for copolymerizing isoprene monomers and monomers of a compound other than isoprene.

In the polymerization step, isoprene monomers and monomers of a compound other than isoprene can be copolymerized in a manner similar to that conventionally used in producing polymers using a coordination ion polymerization catalyst, except that the aforementioned polymerization catalyst, or the aforementioned first, second, or third polymerization catalyst composition is used. The polymerization catalyst or the polymerization catalyst compositions used in the present invention have been already described in the above.

The catalyst that may be used in the polymerization step is the aforementioned polymerization catalyst, or the aforementioned first, second, or third polymerization catalyst composition.

An arbitrary method can be employed as the polymerization method including, for example, solution polymerization, suspension polymerization, liquid phase bulk polymerization, emulsion polymerization, vapor phase polymerization, and solid state polymerization. In addition, in the case of using a solvent for polymerization reaction, any solvent may be used that is inert to the polymerization reaction, including, for example, toluene, cyclohexane, n-hexane and mixtures thereof.

In the case of using a polymerization catalyst composition, the polymerization step can be carried out in either one of the following manners. That is, for example, (1) the components forming the polymerization catalyst composition may be separately provided in the polymerization reaction system containing isoprene monomers and monomers of a compound other than isoprene, to thereby prepare the polymerization catalyst composition in the reaction system, or (2) the polymerization catalyst composition prepared in advance may be provided into the polymerization reaction system. Further, the manner (2) also includes providing the metallocene complex (active species) activated by a co-catalyst.

Further, in the polymerization step, a terminator such as methanol, ethanol, and isopropanol may be used to stop the polymerization.

In the polymerization step, the polymerization reaction of the isoprene and a compound other than isoprene may preferably be performed in an inert gas atmosphere, and preferably in nitrogen or argon atmosphere. The polymerization temperature of the polymerization reaction is not particularly limited, but preferably in a range of, for example, −100 to 200° C., and may also be set to temperatures around room temperature. An increase in the polymerization temperature may reduce the cis-1,4-selectivity in the polymerization reaction. The polymerization reaction is preferably performed under pressure in a range of 0.1 to 10.0 MPa so as to allow the isoprene and the compound other than isoprene to be sufficiently introduced into the polymerization system. Further, the reaction time of the polymerization reaction is not particularly limited, but may preferably be in a range of, for example, 1 second to 10 days, which may be selected as appropriate depending on the conditions such as the type of the monomers to be polymerized, the type of the catalyst, and the polymerization temperature.

--Coupling Step--

The coupling step is a step for denaturing end portions of the polymer chains of the isoprene copolymer obtained in the polymerization step, to perform coupling reaction.

In the coupling step, coupling reaction (or specifically denaturing the ends of polymer chains) is preferably performed when the polymerization reaction reaches 100%.

The coupling agent used for the coupling reaction is not particularly limited and may be selected as appropriate depending on the application thereof. Examples the coupling agent include, for example, (i) a tin-containing compound, such as bis(maleic acid-1-octadecyl)dioctyltin(IV), (ii) an isocyanate compound, such as 4,4'-diphenylmethanediisocyanate, and (iii) an alkoxysilane compound, such as glycidylpropyltrimethoxysilane. These coupling agents may be used alone or in combination of two or more.

Among them, bis(maleic acid-1-octadecyl)dioctyltin(IV) is preferable in terms of its high reaction efficiency and low gel-formation property.

The coupling reaction couples the polymer chains to provide polymers having high molecular weight. The coupling reaction also inhibits occurrence of resolutions other than hydrolysis to minimize a decrease in the number average molecular weight (Mn).

The reaction temperature of the coupling reaction is not particularly limited and may be selected as appropriate depending on the application thereof. The temperature is, however, preferably 10 to 100° C., and more preferably 20 to 80° C.

The reaction temperature of 10° C. or higher can prevent a significant decrease in reaction rate, and the reaction temperature of 100° C. or lower can prevent the gelation of polymers.

The reaction time of the coupling reaction is not particularly limited and may be selected as appropriate depending on the application thereof. The reaction time is, however, preferably 10 minutes to 1 hour.

The reaction time of 10 minutes or longer allows the reaction to proceed satisfactorily, and that of 1 hour or shorter can prevent the gelation of the polymers.

--Cleaning Step--

The cleaning step is a step for cleaning the isoprene copolymer obtained in the polymerization step. The medium used in the cleaning is not particularly limited and may be selected as appropriate depending on the application thereof. Examples of the medium include methanol, ethanol, and isopropanol.

(Rubber Composition)

The rubber composition of the present invention contains at least a rubber ingredient, and further contains a filler, a crosslinking agent, and other components as necessary.

<Rubber Ingredient>

The rubber ingredient contains at least one of the synthesized polyisoprene and the isoprene copolymer, and further contains other rubber ingredients as necessary.

The synthesized polyisoprene and the isoprene copolymer have been already described in detail in the above.

The content of the polymer contained in the rubber ingredient (i.e., the total amount (total content) of the synthesized polyisoprene, the isoprene copolymer, or the synthesized polyisoprene and the isoprene copolymer) is not particularly limited and may be selected as appropriate depending on the application thereof. However, the content is preferably 15 to 100% by mass.

The rubber ingredient having the total polymer content of 15 mass % allows the polymer to exhibit its properties satisfactorily.

-Other Rubber Ingredients-

The other rubber ingredients are not particularly limited and may be selected as appropriate depending on the application thereof. Examples of such rubbers include butadiene rubber (BR), styrene butadiene rubber (SBR), acrylonitrile-butadiene rubber (NBR), chloroprene rubber, ethylene-propylene rubber (EPM), ethylene-propylene unconjugated-diene rubber (EPDM), polysulfide rubber, silicone rubber, fluoro-rubber, and urethane rubber. These rubber ingredients may be used alone or in combination of two or more.

<Filler>

The filler is not particularly limited and may be selected as appropriate depending on the application thereof. Examples of the filler include a carbon black and an inorganic filler. The rubber composition preferably contains at least one selected from the carbon black and the inorganic filler. More preferably, the rubber composition contains the carbon black. The filler is added to the rubber composition to reinforce the rubber composition.

The amount (content) of the filler contained in the rubber ingredient is not particularly limited and may be selected as appropriate depending on the application thereof. The content is, however, preferably 10 to 100 mass parts, more preferably 20 to 80 mass parts, and most preferably 30 to 60 mass parts, per 100 mass parts of the rubber ingredient.

The filler contained in an amount of 10 mass parts or more exhibits its effect, and the filler contained in an amount of 100 mass parts or less can be reliably blended into the rubber ingredient. The filler contained in that amount can thus improve the performance of the rubber composition.

The rubber composition containing the filler in an amount within the above "more preferable" or "most preferable" range is advantageous in terms of balance of processability, low-loss performance, and durability.

-Carbon Black-

The carbon black is not particularly limited and may be selected as appropriate depending on the application thereof. Examples of the carbon black include FEF, GPF, SRF, HAF, N339, IISAF, ISAF, SAF. These carbon blacks may be used alone or in combination of two or more.

The nitrogen adsorption specific surface area of the carbon black, which is determined according to $N_2SA$ JIS K 6217-2: 2001, is not particularly limited and may be selected as appropriate depending on the application thereof. However, it is preferably 20 to 150 $m^2/g$, and more preferably 35 to 145 $m^2/g$.

The rubber composition having the carbon black with 20 $m^2/g$ or more nitrogen adsorption specific surface area ($N_2SA$) can prevent deterioration in durability of the obtained rubber, thereby achieving sufficient crack growth resistance. The rubber composition having the carbon black with 100 $m^2/g$ or less nitrogen adsorption specific surface area ($N_2SA$) can improve low-loss performance, thereby enhancing workability.

The content of the carbon black per 100 mass parts of the rubber ingredient is not particularly limited and may be selected as appropriate depending on the application thereof. However, it is preferably 10 to 100 mass parts, more preferably 10 to 70 mass parts, and most preferably 20 to 60 mass parts.

The rubber composition containing the carbon black in an amount of 10 mass parts or more can prevent decline in breaking resistance caused by insufficient reinforcement, and the rubber composition containing 100 mass parts or less carbon black can prevent deterioration in processability and low-loss performance.

The rubber composition containing the carbon black in an amount within the above "more preferable" or "most preferable" range is advantageous in terms of maintaining a balance in each of the performances.

-Inorganic Filler-

The inorganic filler is not particularly limited and may be selected as appropriate depending on the application thereof. Examples of the inorganic filler include silica, aluminum hydroxide, clay, alumina, talc, mica, kaolin, glass balloon, glass beads, calcium carbonate, magnesium carbonate, magnesium hydroxide, magnesium oxide, titanium oxide, potassium titanate, and barium sulfate. These inorganic fillers may be used alone or in combination of two or more.

In using an inorganic filler, a silane coupling agent may also be used as appropriate.

<Crosslinking Agent>

The crosslinking agent is not particularly limited and may be selected as appropriate depending on the application thereof. Examples of the crosslinking agent include a sulfur-containing crosslinking agent, an organic peroxide-containing crosslinking agent, an inorganic crosslinking agent, a polyamine crosslinking agent, a resin crosslinking agent, a sulfur compound-based crosslinking agent, an oxime-nitrosamine-based crosslinking agent, and sulfur, with the sulfur-containing crosslinking agent being more preferred as the rubber composition for a tire.

The content of the crosslinking agent is not particularly limited and may be selected as appropriate depending on the application thereof. The preferred content thereof is, however, 0.1 to 20 mass parts per 100 mass parts of the rubber ingredient.

The rubber composition containing the crosslinking agent in an amount of 0.1 mass parts or more can develop crosslinking, and the rubber composition containing the crosslinking agent in an amount of 20 mass parts or less can prevent the crosslinking that may be caused by part of the crosslinking agent during kneading, and can prevent the loss of physical properties of vulcanizate.

<Other Components>

The rubber composition may further contain a vulcanization accelerator in addition to the above components. Examples of compounds that can be used as the vulcanization accelerator include guanidine-based compounds, aldehyde-amine-based compounds, aldehyde-ammonia-based compounds, thiazole-based compounds, sulfenamide-based compounds, thiourea-based compounds, thiuram-based compounds, dethiocarbamate-based compounds, and xanthate-based compounds.

Further, if necessary, any known agent such as a softening agent, a vulcanizing co-agent, a colorant, a flame retardant, a lubricant, a foaming agent, a plasticizer, a processing aid, an antioxidant, an age resister, an anti-scorch agent, an ultraviolet rays protecting agent, an antistatic agent, a color protecting agent, and other compounding agent may be used according to the intended use thereof.

(Crosslinked Rubber Composition)

The crosslinked rubber composition according to the present invention is not particularly limited as long as being obtained by crosslinking the rubber composition of the present invention, and may be selected as appropriate depending on the application thereof.

The conditions of the crosslinking are not particularly limited and may be selected as appropriate depending on the application thereof. However, a preferred temperature is 120 to 200° C. and a preferred heating time is 1 to 900 minutes.

(Tire)

The tire of the present invention is not particularly limited as long as it contains the crosslinked rubber composition of the present invention, and may be selected as appropriate depending on the application thereof.

The crosslinked rubber composition of the present invention may be used in any portion of the tire, and the portion may be selected as appropriate depending on the application thereof. Examples of the portion include, for example, a tread, a base tread, a sidewall, a side reinforcing rubber, and a bead filler.

Among these portions, the crosslinked rubber composition used in a tread is advantageous in terms of durability.

The tire can be produced by using a conventional method. For example, a carcass layer, a belt layer, a tread layer, which are composed of unvulcanized rubber and/or cords, and other members used for the production of usual tires are successively laminated on a tire molding drum, then the drum is withdrawn to obtain a green tire. Thereafter, the green tire is heated and vulcanized in accordance with an ordinary method, to thereby obtain a desired tire (for example a pneumatic tire).

(Applications Other than Tires)

The crosslinked rubber composition of the present invention may be used for applications other than tires, such as anti-vibration rubber, seismic isolation rubber, a belt (conveyor belt), a rubber crawler, and various types of hoses.

EXAMPLES

In the following, the present invention will be described in further detail with reference to Examples. However, the present invention is in no way limited to the following Examples.

Producing Example 1

Method of Producing Polymer A

To obtain polymer A, 6.2 μmol of tris[bis(trimethylsilyl)amide]gadolinium $Gd[N(SiMe_3)_2]_3$, 3.22 mmol of triisobutylaluminum, and 5.0 g of toluene were placed in a 1 L pressure-resistant glass reactor in a glove box under nitrogen atmosphere, and the compounds were aged for 30 minutes. Subsequently, 6.2 μmol of triphenylcarbonium tetrakis(pentafluorophenyl)borate $(Ph_3CB(C_6F_5)_4)$ and 472.0 g of cyclohexane were placed in the reactor and the compounds were further aged for 30 minutes. The reactor was then taken out from the glove box, and 120.0 g of isoprene was added to the reactor. Polymerization was then performed at room temperature for 12 hours. After the polymerization, 1 mL of an isopropanol solution containing 2,2'-methylene-bis(4-ethyl-6-t-butylphenol) (NS-5) in an amount of 5 mass % was added to the reactor to stop the reaction. Large amounts of methanol were further added to the reactor to isolate the polymers, and the isolated polymers were vacuum dried at 70° C. to obtain polymer A. The yield of polymer A thus obtained was 103.0 g.

Producing Example 2

Method of Producing Polymer B

To obtain polymer B, 4.65 μmol of tris[bis(trimethylsilyl)amide]gadolinium $Gd[N(SiMe_3)_2]_3$, 0.70 mmol of diisobutylaluminum hydride, and 5.0 g of toluene were placed in a 1 L pressure-resistant glass reactor in a glove box under nitrogen atmosphere, and the compounds were aged for 30 minutes. Subsequently, 4.65 μmol of triphenylcarbonium tetrakis(pentafluorophenyl)borate $(Ph_3CB(C_6F_5)_4)$ and 378.0 g of cyclohexane were placed in the reactor and the compounds were further aged for 30 minutes. The reactor was then taken out from the glove box, and 127.5 g of isoprene was added to the reactor. Polymerization was then performed at room temperature for 3 hours. After the polymerization, 1 mL of an isopropanol solution containing 2,2'-methylene-bis(4-ethyl-6-t-butylphenol) (NS-5) in an amount of 5 mass % was added to the reactor to stop the reaction. Large amounts of methanol were further added to the reactor to isolate the polymers, and the isolated polymers were vacuum dried at 70° C. to obtain polymer B. The yield of polymer B thus obtained was 99.0 g.

Producing Example 3

Method of Producing Polymer C

To obtain polymer C, 50.0 μmol of tris[bis(trimethylsilyl)amide]gadolinium $Gd[N(SiMe_3)_2]_3$, 0.50 mmol of triisobutylaluminum, and 50.0 g of toluene were placed in a 1 L pressure-resistant glass reactor in a glove box under nitrogen atmosphere, and the compounds were aged for 30 minutes. Subsequently, 50.0 μmol of triphenylcarbonium tetrakis(pentafluorophenyl)borate $(Ph_3CB(C_6F_5)_4)$ and 300.0 g of normal hexane were placed in the reactor and the compounds were further aged for 30 minutes. The reactor was then taken out from the glove box, and 50.0 g of isoprene was added to the reactor. Polymerization was then performed at room temperature for 3 hours. After the polymerization, 1 mL of an isopropanol solution containing 2,2'-methylene-bis(4-ethyl-6-t-butylphenol) (NS-5) in an amount of 5 mass % was added to the reactor to stop the reaction. Large amounts of methanol were further added to the reactor to isolate the polymers, and the isolated polymers were vacuum dried at 70° C. to obtain polymer C. The yield of polymer C thus obtained was 23.0 g.

Polymers A to C prepared as above and isoprene rubber (trade name: IR2200, JSR Corporation) were measured and evaluated with the following method to investigate the microstructure (cis-1,4 bond content), the number average molecular weight (Mn), and the molecular weight distribution (Mw/Mn). The results are shown in Table 1.

In addition, the gel fractions and the amount of residual catalysts of Polymers A to C prepared as above and polyisoprene rubber (trade name: IR2200, JSR Corporation) were also measured and evaluated with the following method. The results are also shown in Table 1.

<Method of Analyzing Polymer>

(1) Microstructure (Cis-1,4 Bond Content)

The microstructures were calculated from the integral ratio between the peaks obtained from $^1$H-NMR and $^{13}$C-NMR [$^1$H-NMR: δ4.6-4.8 ($=CH_2$ of 3,4-vinyl unit), 5.0-5.2 ($—CH=$ of 1,4-unit); $^{13}$C-NMR: δ23.4 (1,4-cis unit), 15.9 (1,4-trans unit), 18.6 (3,4-unit)]. The number average molecular weights (Mn) and molecular weight distributions (Mw/Mn) were obtained by GPC by using polystyrene as a standard substance.

(2) Number Average Molecular Weight (Mn) and Molecular Weight Distribution (Mw/Mn)

The number average molecular weights (Mn) and molecular weight distributions (Mw/Mn) were measured by gel permeation chromatography [GPC: HLC-8020 (manufactured by Tosoh Corporation)] by using a refractometer as a detector, and calculated in terms of polystyrene by referencing monodisperse polystyrene as a standard. The column was GMHXL (manufactured by Tosoh Corporation), the elute was tetrahydrofuran, and the measurement temperature was 40° C.

(3) Gel Fraction

To determine the gel fraction, 12 mg of sample polymers were placed in sample bottles containing 5 cc of tetrahydrofuran, and the sample bottle were allowed to stand overnight. The solutions were then passed through a 0.45 μm PTFE filter, and GPC measurement was conducted. The sample areas (mV) of RI obtained by GPC measurement were divided by sample weights used to calculate the percentage.

<Amount of Residual Catalyst>

The amount of residual catalyst (i.e., amount of residual metal) was measured by performing elemental analysis.

TABLE 1

|  | Polymer A | Polymer B | Polymer C | IR2200 |
|---|---|---|---|---|
| Mn (×10³) | 586 | 775 | 2,390 | 341 |
| Mw/Mn | 2.68 | 2.63 | 2.19 | 4.87 |
| Cis-1,4 bond content (%) | 98.2 | 97.6 | 96.9 | 95.0 |
| Amount of residual catalyst (ppm) | 280 | 60 | 220 | 530 |
| Gel fraction (%) | 15 | 14 | 14 | 25 |

<Method of Evaluating Rubber Composition>

Vulcanized rubber obtained by preparing and vulcanizing the rubber composition having the compounding formulation shown in Table 2 was evaluated by the following method to measure (1) breaking resistance and (2) abrasion resistance. The results are shown in Table 3.

(1) Breaking Resistance (Expressed by Index)

A tensile test was conducted at room temperature in accordance with JIS K 6301-1995 to measure the tensile strength (Tb) of the vulcanized rubber compositions. The tensile strengths, expressed by an index obtained by determining the tensile strength of Comparative Example as 100, are shown in Table 3. A greater index value indicates better breaking resistance.

(2) Abrasion Resistance (Expressed by Index)

The amount of abrasion was measured with a Lambourn abrasion testing machine at a slip rate of 60% at room temperature. The abrasion resistance was expressed by an index obtained by using the reciprocal of the ratio of the abrasion amount of Example to that of Comparative Example. A greater index value indicates better abrasion resistance.

TABLE 2

|  | Component | Mass part |
|---|---|---|
| Master batch | Polymer *1 | 50.0 |
|  | Natural rubber (NR) *2 | 50.0 |
|  | Carbon black ISAF *3 | 45.0 |
|  | Stearic acid | 2.0 |
|  | Wax *4 | 2.0 |
|  | Antioxidant 6C *5 | 1.0 |

TABLE 2-continued

|  | Component | Mass part |
|---|---|---|
| Final batch | Zinc white | 3.0 |
|  | Vulcanization accelerator TBBS *6 | 1.0 |
|  | Sulfur | 1.4 |

*1: Polymers A to C and polyisoprene rubber (trade name: IR2200, manufactured by JSR Corporation)
*2: RSS #3
*3: Seast 6 (manufactured by Tokai Carbon Co., Ltd.)
*4: Microcrystalline wax: Ozoace0280 (manufactured by Nippon Seiro Co., Ltd.)
*5: N-(1,3-dimethylbutyl)-N'-p-phenylenediamine, NOCRAC 6C (manufactured by Ouchi Shinko Chemical Industrial Co., Ltd.)
*6: N-tert-butyl-2-benzothiazilsulfenicamide, NOCCELER NS (manufactured by Ouchi Shinko Chemical Industrial Co., Ltd.)

TABLE 3

|  | Example 1 Polymer A | Example 2 Polymer B | Example 3 Polymer C | Comparative Example IR2200 |
|---|---|---|---|---|
| Breaking resistance | 106 | 103 | 110 | 100 |
| Abrasion resistance | 104 | 103 | 112 | 100 |

Table 3 shows that, in the synthesized polyisoprene contained in the rubber composition, the polymer containing a residual catalyst in an amount of 300 ppm or less can provide a crosslinked rubber composition with improved durability (i.e, breaking resistance, abrasion resistance, and crack growth resistance).

INDUSTRIAL APPLICABILITY

The polymer and the rubber composition containing the polymer of the present invention can be suitably used in, for example, tire members, particularly in the tread member of tire.

The invention claimed is:

1. A polymer being a synthesized polyisoprene or an isoprene copolymer, the polymer having residual catalyst derived from a catalyst used in polymerization in an amount of 300 ppm or less, and wherein a 3,4-vinyl bond content in an isoprene-derived unit in the synthesized polyisoprene or the isoprene copolymer is 5% or less.

2. The polymer according to claim 1, wherein the catalyst includes a catalyst derived from a Lewis acid.

3. The polymer according to claim 1, having a number average molecular weight (Mn) of 1.5 million or more when measured by gel permeation chromatography (GPC).

4. A rubber composition comprising a rubber ingredient that at least contains the polymer according to claim 1.

5. The rubber composition according to claim 4, wherein the rubber ingredient contains the polymer in an amount of 15 to 100 mass % in total.

6. The rubber composition according to claim 4, further comprising a filler, wherein the rubber composition contains the filler in an amount of 10 to 100 mass parts per 100 mass parts of the rubber ingredient.

7. A tire comprising the rubber composition according to claim 6.

8. A tire comprising a tread member having the rubber composition according to claim 6.

* * * * *